March 24, 1959 — H. R. LUTES — 2,878,719
SLIDE CHANGER
Filed Aug. 9, 1954 — 3 Sheets-Sheet 1

INVENTOR.
HAROLD R. LUTES,
BY
Paul A. Weilein
ATTORNEY.

March 24, 1959 H. R. LUTES 2,878,719
SLIDE CHANGER
Filed Aug. 9, 1954 3 Sheets-Sheet 2
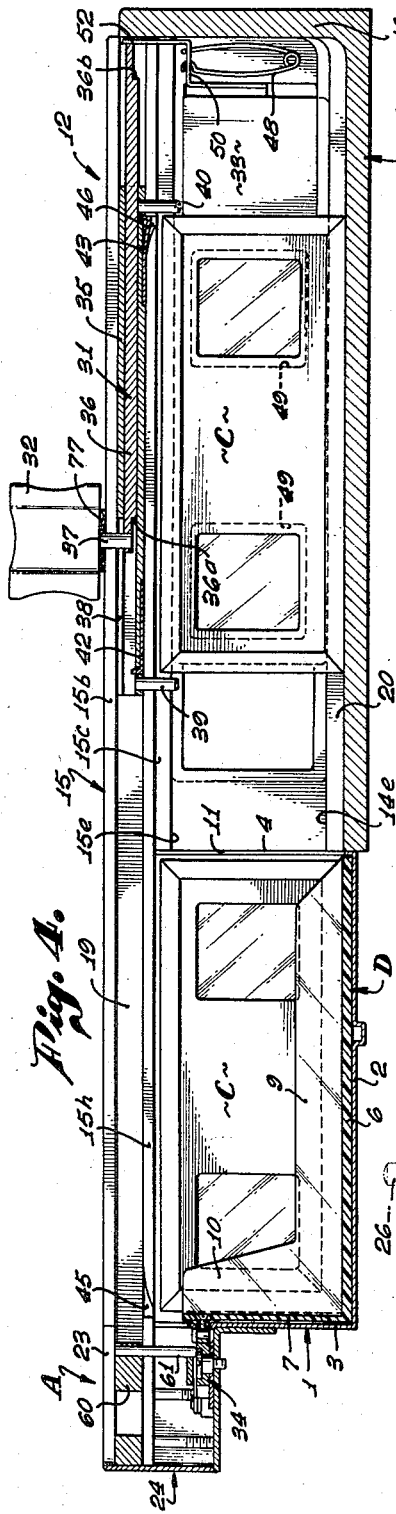
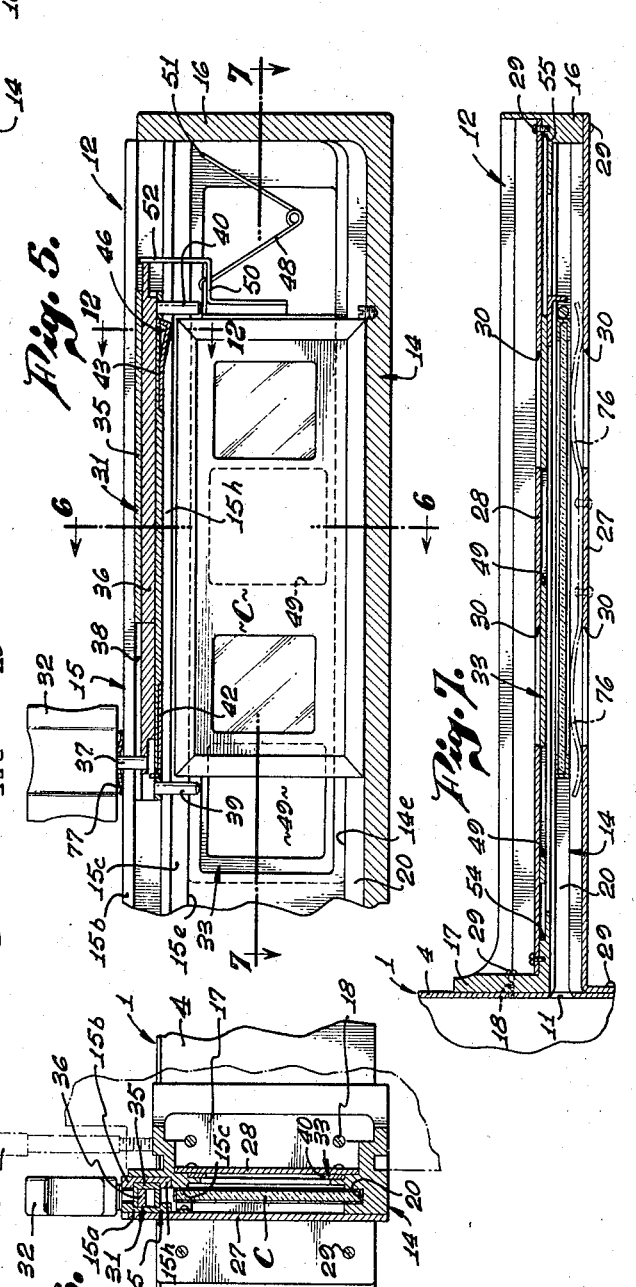
INVENTOR.
HAROLD R. LUTES,
BY
Paul A. Weilein
ATTORNEY.

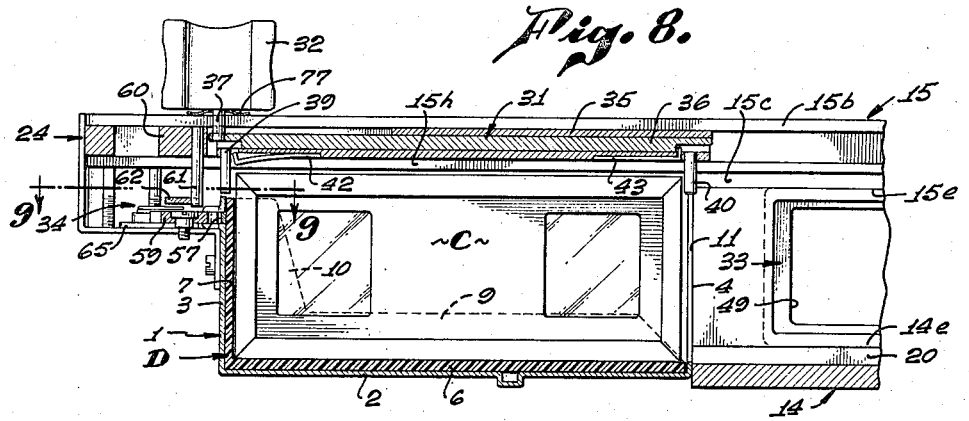
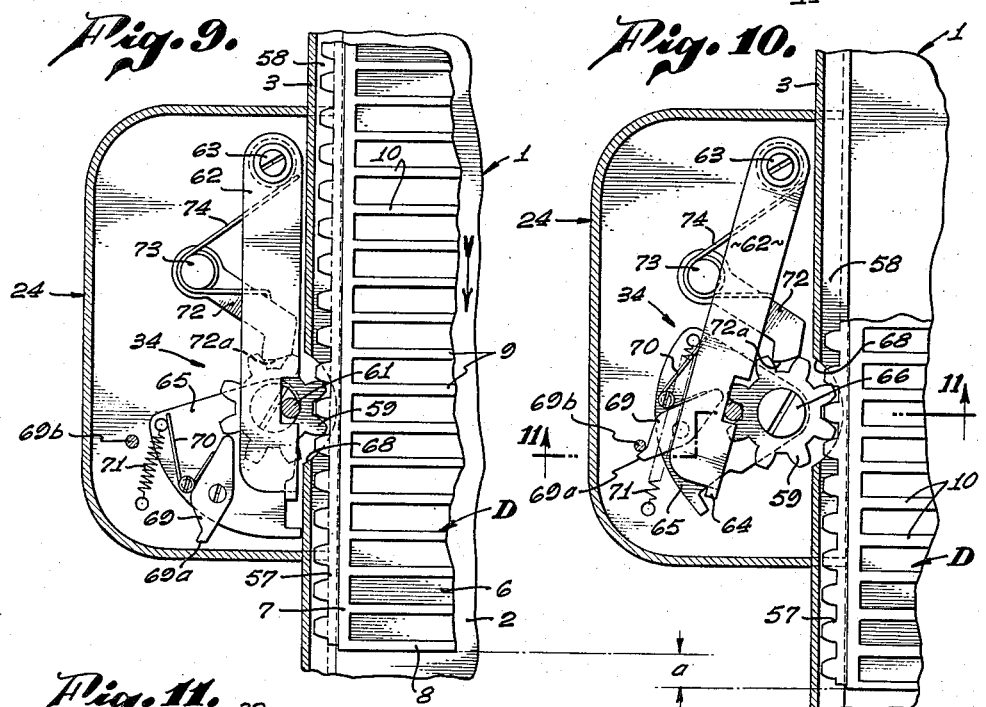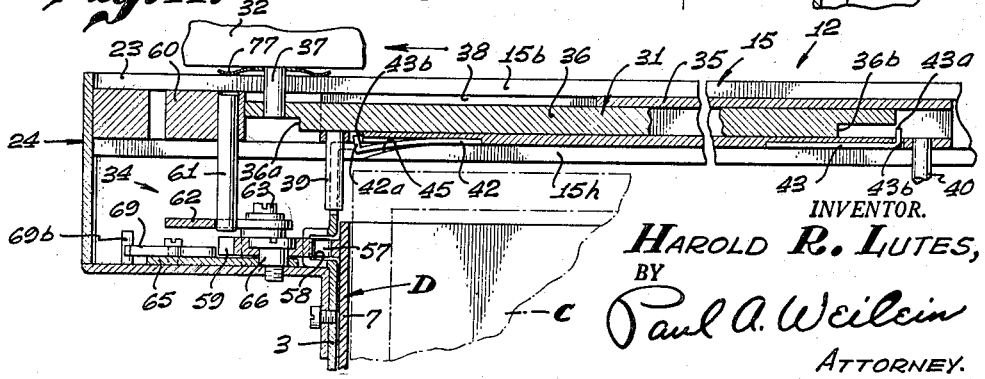

United States Patent Office 2,878,719
Patented Mar. 24, 1959

2,878,719

SLIDE CHANGER

Harold R. Lutes, San Gabriel, Calif.

Application August 9, 1954, Serial No. 448,642

17 Claims. (Cl. 88—28)

This invention relates to slide changers for use with devices for viewing or projecting images contained in the slides.

It is an object of this invention to provide an efficient slide changer such as described which is particularly adapted for changing stereoscopic slides instereoscopic viewers or projectors.

It is another object of this invention to provide a simple, economical and reliable slide changer which may be attached to a viewer or projector and readily operated to move a plurality of slides successively into and out of viewing position.

It is another object hereof to provide in a slide changer such as described, a novel blind which obstructs light from the image in the slide when the latter is moved into position to be viewed, and thereafter is movable in a novel manner, first, to uncover the image and then, before the slide is retracted, to again obstruct light from the image, in both instances with a "wiping" action, thereby eliminating objectionable visual effects, such as movement of the image and consequent eye strain, fatigue and confusion.

It is another object hereof to provide a slide changer such as described wherein means for operating a slide carrier, when moved in one direction, will cause the carrier to position the slide in proper registration with the viewer or projector, but behind the blind so as to uncover the image with a "wiping" action, thereby providing for the desired "black out" and "wiping on" effects with a simple unidirectional movement of the operating means.

It is an additional object to provide a slide changer of the character described, wherein the slide carrier includes means associated with an operating handle for the carrier whereby, upon movement of the handle in one direction from the position it occupies when the image is uncovered for viewing, the blind will be moved to "black out" the image before the slide is moved out of viewing position; and wherein continued movement of the carrier handle in said one direction causes the slide to be retracted and the blind to be positioned for obstructing light from the image of the slide next to be moved into viewing position, thereby effecting the desired "wipe out" of the image and the retraction of the slide, in a simple unidirectional movement of the carrier handle.

Further it is an object of this invention to provide a slide changer such as described, wherein the movement of the carrier handle past a position which it occupies when a slide is retracted from viewing position into a slide magazine, will cause the magazine to be shifted to position another slide for movement into viewing position, thereby with a unidirectional movement of the carrier handle, providing for the "wipe out" of the image, the movement of a slide from viewing position back into the magazine and the movement of the magazine to dispose another slide in position for movement by the carrier into viewing position.

An additional object of this invention is to provide a slide changer such as described wherein a novel and simply constructed slide carrier makes it possible to operate the blind as well as the maens for moving the magazine so that a plurality of slides may be successively exhibited, in a particularly easy manner with the desired "wipe on" and "wipe out" action.

It is another object hereof to provide a slide changer such as described wherein the slide carrier handle when moved to retract a slide into the magazine meets with such resistance to further movement thereof required for the shifting of the magazine, that the operator is thus apprised of the positioning of the slide in the magazine, and optionally may move the same slide into and out of viewing position as many times as desired without shifting the magazine, or shift the magazine to bring another slide into position to be moved into viewing position.

A further object is to provide in a slide changer a novel and simply constructed slide carrier which embodies two relatively movable parts operable on a guide track and arranged so that responsive to movement of a handle attached to one of such parts, the other part will engage and move the slide between predetermined positions with respect to the slide magazine and the viewer or projector, and wherein the part attached to the handle may be moved to actuate the blind and the means for shifting the magazine respectively, upon further movement of the handle while said slide is in said predetermined positions, thereby simplifying the construction and operation of the changer.

This invention possesses many other advantages and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 4 is a sectional view on an enlarged scale taken on the line 4—4 of Fig. 2, showing the slide in viewing position;

Fig. 5 is a fragmentary sectional view similar to Fig. 4, showing the slide and blind in position to "black out" the image in the slide;

Fig. 6 is a vertical sectional view taken on the line 6—6 of Fig. 5;

Fig. 7 is a horizontal sectional view taken on the line 7—7 of Fig. 5;

Fig. 8 is a fragmentary longitudinal sectional view taken on the line 8—8 of Fig. 2, but showing the slide carrier in position in the magazine.

Fig. 9 is a fragmentary horizontal sectional view taken on the plane of line 9—9 of Fig. 8;

Fig. 10 is a sectional view similar to Fig. 9, showing the parts in a different position than in Fig. 9;

Fig. 11 is a fragmentary cross sectional view taken on the line 11—11 of Fig. 10.

Figure 1:
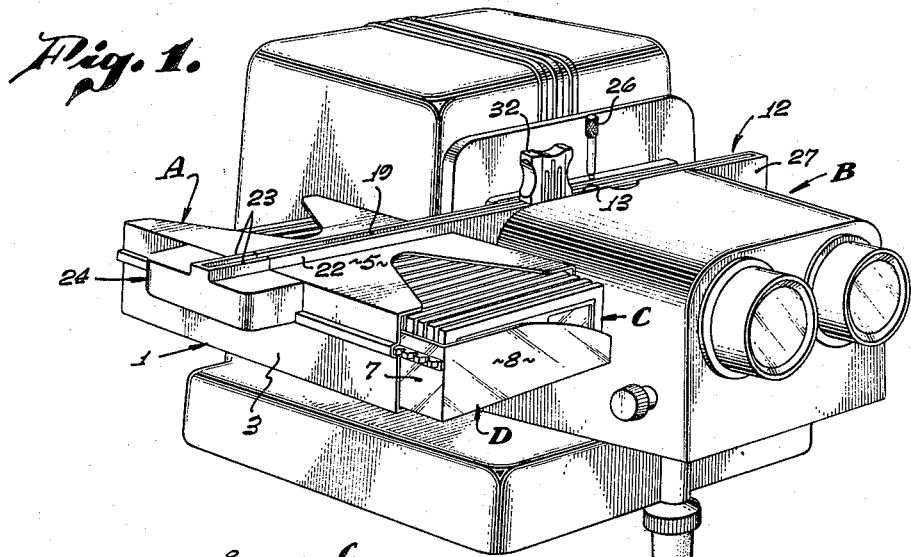
Fig. 1 is a perspective view of a slide changer embodying the present invention, as attached to a stereoscopic projector.
Figure 2:
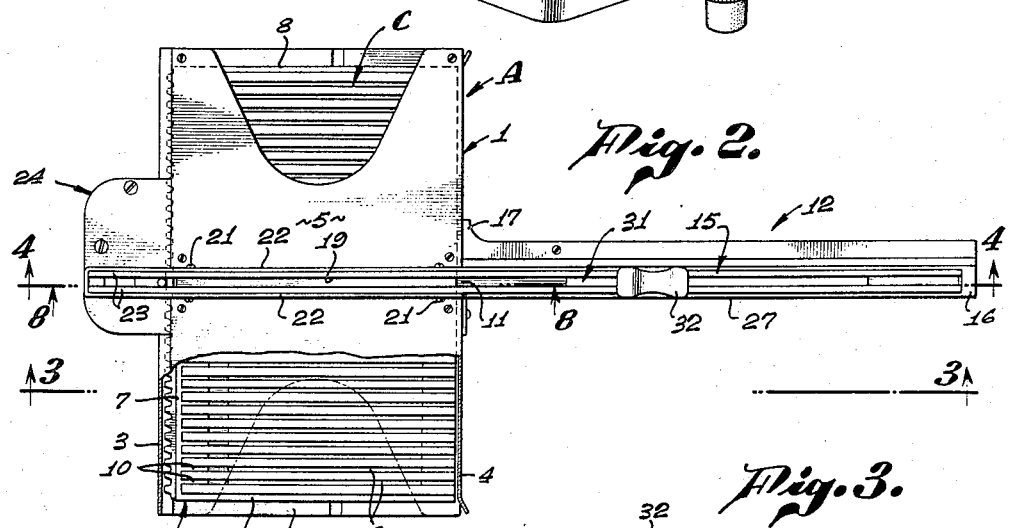
Fig. 2 is a top plan view of the slide changer with a portion broken away for clarity of illustration.
Figure 3:
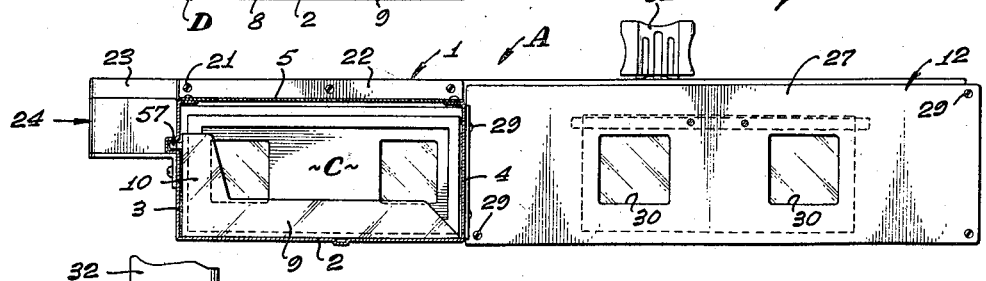
Fig. 3 is a sectional view taken on the plane of line 3—3 of Fig. 2.

As shown in Fig. 1 of the accompanying drawing, a slide changer A embodying the present invention is attached to a stereoscopic projector B so as to be operable for consecutively moving slides C containing stereoscopic images, into and out of position to be observed in the projector. Thus, the changer includes a magazine D adapted to contain a plurality of the slides C.

Although the slide changer is here shown as attached to a projector, it is to be understood that it may be used to equal advantage in connection with a viewer.

In the present embodiment, the slide changer includes a body 1 in the form of a rectangular housing having a bottom wall 2, side walls 3 and 4, and a top wall 5, the ends being open, whereby the slide magazine D may be mounted in and removed from the body.

The magazine D is rectangular and comprises a bottom wall 6, one side wall 7, two end walls 8, and series of matching partitions 9 and 10 on the bottom wall and side wall respectively, forming pockets for the slides C. The slides are moved from the magazine and retracted into the magazine through the open side of the magazine and a slot 11 in the side wall 4 of the body 1.

Means generally designated 12 is provided to form a guide which extends from the side wall 3 of the body 1 and is adapted to be mounted in a slot 13 in the viewer B whereby the slides C may be moved into and out of viewing position.

As here shown, the guide means 12 includes a pair of opposed lower and upper tracks 14 and 15 for guiding the slides therebetween, these tracks being joined at their outer ends by a web 16. The inner end of the lower track 14 is joined to the intermediate portion of the upper track 15 by means of a web 17, which is secured by suitable fastenings 18 to the wall 4 of the body 1.

The upper track 15 extends across the top wall 5 of the body and terminates beyond the side wall 4 of the body, there being a slot 19 in the top wall 5 to accommodate the upper track.

The lower track 14 is provided with a slide-receiving groove 20 extending longitudinally thereof in alignment with the slot 11 in the side wall 3 of the body 1. The lower edges of the slides C will slide in the groove 20 when moving the slides into and out of viewing position.

The upper track 15 is composed of laterally opposed rails 15a and 15b which are fastened as at 21 to opposed flanges 22 extending along opposite sides of the slot 19 in the top wall 5 of the body 1. The ends of these rails remote from the body 1 are joined to the upper end of the vertical web 16 whereas the other ends thereof are fastened to flanges 23 on a small housing 24 fixed on the side wall 3 of the body 1.

The space between those portions of the opposed rails 15a and 15b which extend from the side wall 4 of the body 1 as shown in Figs. 4, 5 and 6, slidably receives the upper edges of the slides C. Thus, with reference to Figs. 4, 5 and 6, it will be apparent that the slides C are guided in upright position in the groove 20 and slot 15c, in being moved into and out of position to be viewed.

When a slide is disposed in viewing position the images thereon are in registry with the elements in the viewer or projector by which the image may be viewed or projected. This registry is assured by a set screw 26 (Figs. 1 and 6) arranged on the projector to engage the upper track 15 as shown in Fig. 6, so as to hold the track forming means 12 in proper position within the viewer.

If desired, side walls 27 and 28 may be mounted on the tracks 14 and 15 to enclose the space in which the slides are moved into and out of viewing positions, said walls being held in place by fastenings 29. When these walls are used, they are provided with a pair of registering openings or windows 30 with which the twin images of the slides C will register when a slide is disposed in viewing position.

In accordance with this invention, a slide carrier generally designated 31 is reciprocally mounted on the upper rails 15a and 15b for moving the slides C into and out of viewing position. In the present embodiment of this invention the carrier 31 includes an upstanding operating handle 32 by which the carrier is reciprocated to move the slides into and out of viewing position. This handle is also movable in a novel manner after movement thereof to position to retract a slide, so as to operate a blind 33 and a means 34 for shifting the magazine. This arrangement is such that when the handle 32 is moved in one direction to cause the carrier 31 to engage and move a slide C into viewing position, continued movement of the handle in the same direction past a point in which the slide is disposed in viewing position, with one end of the slide engaged with a set screw 14' or other stop means in the base of groove 20, will cause means associated with the carrier to move the blind from a normal position in which it obstructs the passage of light through the slide images, into a position permitting light to pass through the images. Movement of the handle in the opposite direction after the blind is moved out of light obstructing position, will cause the blind to move back into light obstructing position while the slide remains in viewing position. Continuation of such movement of the handle will cause the carrier to move the slide back into the magazine D. Further movement of the handle in the same direction after the slide is retracted into the magazine will cause the magazine shifting means 34 to shift the magazine to dispose another slide for engagement and movement by the carrier into position to be viewed.

With this arrangement it will be seen that the handle 32, with one continuous movement in one direction will first move a slide into viewing position and then move the blind out of light-obstructing position relative to the slide. Likewise, one continuous movement of the handle 32 in the opposite direction will cause the blind to return to light obstructing position, then cause the slide to be returned to the magazine and finally cause the magazine to be shifted to dispose another slide for movement by the carrier into viewing position.

Figure 12:
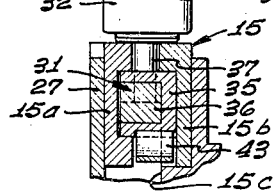
Fig. 12 is a fragmentary sectional view on an enlarged scale, taken on the line 12—12 of Fig. 5.

Referring more specifically to the slide carrier 31 as shown in Figs. 4–8 and 11, it will be seen that it comprises a pair of relatively movable elongated bar-like members 35 and 36 mounted one within the other between the rails 15a and 15b which latter are channelled to slidably receive these elongated members. The carrier member 35 is channel shaped in cross section, as shown in Fig. 12, and has the carrier member 36 disposed in the channel thereof. The handle 32 is mounted on a stem 37 which is slidable in a slot 38 (Figs. 4, 5 and 11) in member 35 and fixed to the member 36.

A pair of slide-engaging pins 39 and 40 depend from the member 35, being spaced as to engage opposite ends of a slide C when the latter is aligned in the magazine D with carrier and guide tracks 14 and 15. The pin 39 causes the slide to be moved from the magazine when the carrier is moved in one direction for this purpose, whereas the pin 40 causes the slide to be moved back into the magazine upon movement of the carrier in the opposite direction.

Means are provided to hold the two members 35 and 36 of the carrier 31 against relative sliding movement while the carrier handle 32 is moved to move a slide into and out of viewing position. This means releases the member 36 for sliding movement relative to the member 35 when a slide is moved into viewing position, as well as when the slide is returned to the magazine. Accordingly, the member 35 of the slide is provided with spring latch members 42 and 43 adjacent the ends thereof. These latch members slide upon the flange 15h of the upper rail 15b and have upturned ends 42a and 43a (Fig. 11) which extend through openings 43b in the member 35 to engage shoulders 36a and 36b on the underside of the carrier member 36, for holding the member 36 against sliding movement relative to the carrier member 35 during movement of the carrier to move the slide into and out of viewing position. However, as the catch members 42 and 43 have one end fixed to the member 35, and are biased so that the free ends thereof tend to move downwardly away from the shoulders 36a and 36b, these catch members will spring downwardly clear of the shoulders 36a and 36b when the free end portions of the catch members come into registry with slots 45 and 46 in the flange 15h of the rail 15b. (See Figs. 4, 5 and 11, particularly.) These slots 45 and 46 are located so that the catch members 42 and 43 will release the carrier member 36 for sliding movement relative to the member 35, and at the same time hold the member 35 against sliding movement when the latter has been moved to position a slide in viewing position as well as when the member 35 has been moved to return the slide to the magazine D. When the catches 42 and 43 release the carrier member 36, the handle 32 may be moved as hereinbefore noted to actuate the blind 33 as well as the means 34 for shifting the magazine D.

The blind 33 is in the form of a rectangular sheet of rigid, opaque material arranged to slide along the outer sides of the rail 15b and the track 14, upon guide flanges 15e and 14e. (See Fig. 6.) The dimensions of this blind are such that when the blind is biased into normal position by a spring 48, imperforate portions thereof will be disposed to obstruct light from passing through images in a slide C when the latter is moved into viewing position. However, when the blind is moved in one direction from its normal position, a pair of windows or openings 49 therein will register with the images in the slide and the openings 30 in the side walls 27 and 28, thereby admitting light in the images so that the viewing or projection thereof may be effected. The spring 48 is fastened at its ends to an extension 50 of the blind 33 and as at 51 to the web joining the outer end of tracks 14 and 15 and resists movement of the blind in a direction causing the openings 49 therein to register with the images in the slide.

The extension 50 has a laterally offset finger 52 which is slidable between the rails 15a and 15b, as seen in Fig. 5, so that it may be engaged by the outer end of the carrier member 36 to which the handle 32 is fixed. Sliding movement of the member 36 in one direction relative to the member 35 will move the blind out of light obstructing position and upon retraction of the member 36, the spring 48 will move the blind back into light obstructing position. Shoulders 54 and 55 on the webs 16 and 17 between the tracks 14 and 15 engage the ends of the blind to limit the movement of the blind to the positions in which the blind obscures light from and admits light to the images in the slide, when the latter is in viewing position.

The means 34 which is subject to operation by the carrier member 36 to shift the magazine D, is mounted in the small housing 24 fixed to the side wall 4 of the body 1. In general, this means comprises ratchet mechanism, as shown in Figs. 8 through 11. Accordingly, a rack bar 57 is fixed on the side wall 7 of the magazine D and is slidable in a channel 58 formed in the side wall 3 of the body, whereby a pinion 59 of the ratchet mechanism in the housing 24, may be engaged with this rack bar for shifting the magazine. Each operation of the pinion 59 as effected through the movement of the handle 32 and carrier member 36 in one direction relative to the carrier member 35, will shift the magazine sufficiently to align a slide C with the slot 11 in the body wall 3 for movement into viewing position.

The ratchet mechanism as here shown includes a slide block 60 operable in the channels of the rails 15a and 15b of the upper track 15, for movement by contact with an end of the carrier member 36 (see Figs. 8 and 11). A pin 61 depending from the block 60 is disposed against an edge of a lever 62 fulcrumed as at 63 on the bottom of the housing 24, as shown in Figs. 9 and 10, so that upon movement of the pin 61 in one direction, the lever will be rocked about its fulcrum. A projection 64 depending from the outer end of the lever 62 bears against one end of a quadrant plate 65 supported on the bottom of the housing 24 so as to swing about a shoulder bolt 66 on which the pinion 59 is supported in the housing 24 above the plate 65. In This connection, it should be noted from Fig. 9, that the wall 3 of the body 1 is provided with a slot 68 to permit the pinion to engage the rack bar 57 on the magazine D.

The quadrant plate 65 mounts a pivoted driving pawl 69 which is urged by a spring 70 on the plate, to engage the teeth of the pinion. A spring 71 normally holds the plate 65 in such position that the pawl 69 is disposed against one of the teeth of the pinion, in a position to turn the pinion for advancing the magazine D.

A "stop" pawl 72 is pivoted at 73 on the bottom of the housing 24 and urged by a spring 74 against the pinion 59. The purpose of the pawl 72 is to limit the turning movement of the pinion 59 in magazine-shifting direction, as will be apparent with reference to Figs. 9 and 10. The pinion 59 will turn freely relative to the pawls 69 and 72 when rotated in a clockwise direction by contact of the rack bar 57 therewith upon moving the magazine into the body 1 from one end of the body, as in the direction of the arrow shown in Fig. 9, due to the shapes of the teeth of the pinion and the ends of the pawl which engage the teeth. However, when the handle 32 is moved to move the carrier member 36 for sliding the block 60 whereby the pin 61 will rock the lever 62 for moving the quadrant plate 65 and thereby move the pawl 69 against the pinion, the pinion will move in a clockwise direction and advance the magazine sufficiently to present a slide C in position to be engaged and moved by the carrier into viewing position. The pawl 72 cams over one tooth of the pinion 59 during this action of driving pawl 69, and engages between two pinion teeth, as shown in Fig. 10, to limit turning movement of the pinion. In moving between the teeth in this manner the cam face 72a of the pawl rides against the tooth to the right thereof under the action of the spring 74 and exerts a force assisting in the turning of the pinion.

When pawl 69 reaches the end of its driving stroke against the pinion 59, the outer end 69a of the pawl encounters a pin 69b on the bottom of the housing 24 as shown in Fig. 10, thereby swinging the pawl free of the pinion teeth whereby the spring 71 will urge the quadrant plate 65 and pawl 69 as well as lever 62, pin 61 and block 60, back into position for another operation of the pinion to shift the magazine.

It is desired that the slide, when in viewing position, be held in a vertical plane for best viewing results. Accordingly, a leaf spring 76 is fixed to the side wall 27 so as to yieldably engage the upper longitudinal portion of a slide C when the latter is in viewing position. This assures that the slide be held in the desired plane in the tracks 14 and 15.

The spring 48 for returning the blind 33 to light obstructing position, tends to move the blind back into this position when the blind is in the position uncovering the images. Accordingly, means are provided to releasably hold the blind against movement into light obstructing position while the slide is being viewed. As here shown, this means includes a spring 77 mounted on the handle stem 37 between the handle 32 and the tops of the rails 15a and 15b so as to frictionally engage the rails with a force sufficient to hold the handle and member 36 against such backward movement until the handle is intentionally moved to allow the blind to be returned by spring 48 into light obstructing position.

In the operation of the slide changer, the handle 32 and carrier 31 must be disposed in rearmost position on the upper track 15, as shown in Fig. 8, to be able to move a slide into viewing position. When in this position the pin 39 on the carrier member 35 is in position to engage one end of one of the slides C in the magazine D.

Assuming that the magazine D contains a plurality of the slides C and is in a position such that one of the slides is aligned with the pins 39 and 40 as well as the slot 11 in the side wall 3 of the body 1, it will be seen that upon moving the handle 32 to the right from the position shown in Fig. 8, the pin 39 will contact the adjacent end of this slide for movement of the slide into viewing position.

If after the magazine D occupies a position such that a slide therein is not in position to be moved by the carrier, the operator may shift the magazine to position a slide for movement by the carrier, by simply pushing the handle to the left of the position shown in Fig. 8. This movement of the handle causes the carrier member 36 to move against the slide block 60 which slides rearwardly and through the pin 61 thereon, rocks the lever 62 so that the plate 65 is swung on its pivot for actuating the drive pawl 69. This pawl causes the pinion 65 engaged with rack bar 57 on the magazine D, to turn and move the magazine in the direction for disposing a slide C in position to be moved by the carrier as hereinbefore described.

The movement of the member 36 for actuating the magazine shifting means is made possible by the spring catch 42 engaging in the slot 45 in the top rail 15b. This engagement of the catch 42 with the slot 45 releases the member 36 for sliding movement and at the same time restrains sliding movement of the carrier member 35. Thus, the member 36 may be actuated as many times as desired, to shift the magazine as necessary for positioning a slide for advance by the carrier into viewing position.

When the carrier pin 39 is engaged with the adjacent end of a slide C in preparation for moving the slide, the handle 32 is moved to the right of the position shown in Fig. 8. This causes the member 36 to move against the upper end 43a of the catch member 43 then held in up position by the track rail 15b as shown in Fig. 8. This causes the member 35 to move to the right and withdraws the catch 42 from the slot 45 thereby causing the carrier members 35 and 36 to move as a unit whereby the slide will be moved by the pin 39 from the magazine through the opening 11 in the wall 3 and on the tracks 14 and 15, into the viewing position, as shown in Fig. 5.

When the slide moves into viewing position, the images thereon are opposite the imperforate portions of the blind 33, as the latter is then held in light-obstructing position by the spring 48, as shown in Fig. 5.

When a slide C reaches the aforesaid viewing position, the spring catch 43 snaps into the slot 46, thereby restraining further sliding movement of the carrier member 35 and releasing the carrier member 36 for sliding movement.

Movement of the handle 32 past the position it reaches when the slide is disposed in viewing position, will cause the released member 36 to engage the finger 52 extending from the blind 33 and thereby move the blind, against the action of the spring 48, out of light obstructing position into the position shown in Fig. 4. The windows or openings 49 in the blind are then aligned with the openings 30 in the side walls 27 and 28 as well as with the images in the slide. These images are now subject to being viewed in the viewer or with a projector, in case the changer is attached to a projector.

The spring 77 between the handle 32 and rails 15a and 15b, frictionally resists movement of the handle as well as the member 36 and the blind 33, from the position these parts occupy when the slide is being viewed or remains in viewing condition with the blind uncovering the images. However, when it is desired to remove the slide from viewing position, the handle 32 is moved back toward the magazine and this intentional movement overcomes the holding force of the spring 77. As the member 36 is thus retracted with the handle 32, the spring 48 urges the blind back into light obstructing position. This action takes place while the slide remains in viewing position. Thus, the blind 33 progressively "blacks out" the images with a "wiping out" action before the slide is moved. Likewise, when the blind is moved out of light obscuring position it gradually exposes the images to the light with a "wiping on" action. These "wiping" actions prevent image movement and resulting visual confusion and fatigue.

When the handle 32 and member 36 are moved past the point where the blind 33 is returned to light obstructing position, the spring catch 42 which is then held (as seen in Figs. 4 and 5) against springing downwardly, by the track 15b, is disposed in the path of movement of member 36. Consequently, as the member 36 is moved toward the magazine, the shoulder 36a thereon encounters the upper end 42a of the catch member 42 thereby causing the carrier member 35 to move with the carrier member 36. As the member 35 is thus moved the pin 40 thereon engaging the outer end of the slide C thereby causing the slide to be moved with the carrier back into the magazine D.

When the carrier 31 has moved a slide C back into the magazine D, the handle 32 and carrier occupy the position shown in Fig. 8. When this position is reached, the catch member 42 snaps into the slot 45, thereby restraining further sliding movement of the carrier member 35 and releasing the carrier member 36 for movement as hereinbefore noted to actuate the mechanism 34 for shifting the magazine to bring another slide into position to be moved by the carrier into viewing position.

The plurality of slides C in the magazine D, as will now be apparent, may be moved consecutively in a particularly efficacious manner into and out of position to be viewed or projected with the slide changer of the present invention.

I claim:

1. A device for moving a slide containing an image, into and out of viewing position with respect to a viewer or projector including: means providing a guide track for said slide; a carrier for the slide reciprocable on said track to move said slide into and out of said viewing position; an opaque blind normally disposed to obstruct the passage of light through said image; a slide member movable in one direction on and relative to said carrier for engaging and moving said blind out of said light obstructing position following the movement of said slide into said viewing position; means urging said blind back into said light obstructing position responsive to movement of said slide member in the opposite direction relative to said carrier while said slide is in said viewing position; and means for releasably connecting said slide member for movement with said carrier and for releasing said slide member for said relative movements thereof incident to said carrier moving said slide into said viewing position.

2. A device for moving a slide containing an image, into and out of viewing position with respect to a viewer or projector, including: means providing a guide track for said slide; a carrier for the slide reciprocable on said track to move said slide into and out of said viewing position; an opaque blind normally disposed to one side of said track in a position to obstruct the passage of light through said image when said slide is moved into said viewing position; spring means biasing said blind normally to occupy said light obstructing position; a slide member movable on and relative to said carrier for engaging and moving said blind out of said light obstructing position following movement of said slide into said viewing position; a means on said carrier releasably connecting said slide member with said carrier, releasing said slide member for relative movement responsive to movement of said carrier to dispose said slide in viewing position; said guide track defining means having means engageable by said releasable connecting means for restraining movement of said carrier when said slide member is released.

3. A device for moving a slide containing an image, into and out of viewing position with respect to a viewer or projector, including: means providing a guide track for said slide; a carrier for the slide reciprocable on said track to move said slide into and out of said viewing position; means releasably restraining movement of said carrier past a position disposing said slide in said viewing position; a blind disposed to one side of said track in position to obstruct the passage of light through said image when said slide is in said viewing position; a slide member movable on and relative to said carrier following said restraint of said carrier for moving said blind out of said light obstructing position; and means normally urging said blind toward said light obstructing position; said restraining means having portions engaged with said carrier for releasably connecting said slide member with said carrier to dispose said slide in said viewing position and releasing said slide member for said relative movement upon operation thereof to restrain said carrier.

4. A device for moving a slide containing an image, into and out of viewing position with respect to a viewer or projector, including: means providing a guide track; a carrier for the slide reciprocable on said track; said carrier including a pair of relatively slidable members; a handle on one of said carrier members by which said carrier members may be moved along said track; means on the other carrier member for engaging the slide to move the slide into and out of said viewing position; means releasably restraining relative sliding movement between said carrier members during movement of said slide into said viewing position; means for effecting release of said restraining means to release said one carrier member for sliding movement relative to the other carrier member upon movement of said slide into said viewing position; and an opaque blind normally disposed for obstructing the passage of light through said image; said one carrier member and said blind having cooperatively engageable means to move said blind out of said light obstructing position responsive to movement of said handle in one direction following said release of said one carrier member.

5. A device for moving a slide containing an image, into and out of viewing position with respect to a viewer or projector, including: means providing a guide track; a carrier for the slide reciprocable on said track; said carrier including a pair of relatively slidable members; a handle on one of said carrier members by which said carrier members may be moved along said track; means on the other carrier member for engaging the slide to move the slide into and out of said viewing position; means releasably restraining relative sliding movement between said carrier members during movement of said slide into said viewing position; means for effecting release of said restraining means to release said one carrier member for sliding movement relative to the other carrier member upon movement of said slide into said viewing position; and an opaque blind normally disposed for obstructing the passage of light through said image; said one carrier member being operable to engage and move said blind out of said light obstructing position responsive to movement of said handle in one direction following said release; said restraining means operating to restrain relative sliding movement between said carrier members upon movement of said handle in the opposite direction following said movement of said blind, whereby upon continued movement of said handle in said opposite direction said carrier will move said slide out of said viewing position.

6. A device for moving a slide containing an image, into and out of viewing position with respect to a viewer or projector, including: means providing a guide track for said slide; a carrier for the slide reciprocable on said track; said carrier including a pair of relatively slidable members; a handle on one of said carrier members by which said carrier members may be moved along said track; means on the other carrier member for engaging the slide to move the slide into and out of said viewing position; means releasably restraining relative sliding movement between said carrier members during movement of said slide into said viewing position; means for effecting release of said restraining means to release said one carrier member for sliding movement relative to the other carrier member upon movement of said slide into said viewing position; and an opaque blind for obstructing the passage of light through said image; said one carrier member being operable to engage and move said blind out of said light obstructing position responsive to movement of said handle in one direction following said release; spring means biasing said blind to occupy said light obstructing position upon movement of said handle in the opposite direction following said movement of said blind out of said light obstructing position; said restraining means operating to restrain relative sliding movement between said carrier members upon continued movement of said handle in said opposite direction whereby said slide may be moved out of said viewing position.

7. A device for moving a plurality of image-containing slides successively into and out of viewing position with respect to a viewer or projector, including: a magazine for the plurality of slides; a body on which said magazine is mounted; means providing a track extending from said body; carrier means movable on said track to move slides from said magazine into and out of said viewing position; an opaque blind slidable along one side of said track into and out of a position for obstructing the passage of light through the image in the slide, means on said body and said magazine operable responsive to said carrier means for shifting said magazine to dispose the slides successively in position to be moved into viewing position; and a member on said carrier means slidable in one direction while a slide is disposed in said viewing position, said member and said blind having cooperatively engageable means for moving said blind out of said light obstructing position; said members also having means engageable with said magazine shifting means when moved in the opposite direction for operating the magazine shifting means.

8. A device for moving a plurality of image-containing slides successively into and out of viewing position with respect to a viewer or projector, including: a magazine for the plurality of slides; a body on which said magazine is mounted; means providing a track extending from said body; carrier means movable on said track to move slides from said magazine into and out of said viewing position; an opaque blind slidable along one side of the track into and out of a position for obstructing the passage of light through the image in the slide; means associated with said body and said magazine operable for shifting said magazine successively to dispose the slides in position to be moved into viewing position; and a longitudinally extended member slidably supported on said carrier means for movement in opposite directions relative thereto; said member having means at one end engageable with said magazine shifting means to operate the latter and having means at its other end engageable with said blind to move the blind out of said light obstructing position upon movement of the member in opposite directions relative to said carrier.

9. In a slide changer for moving a plurality of slides containing images into and out of a viewing position with respect to a viewer or projector; a magazine for a plurality of such slides; a body supporting said magazine; a guide track for said slides extending from said body; carrier means reciprocal on said track for moving said slides from said magazine into said viewing position and vice-versa; a blind slidable along one side of said track into and out of a position obstructing the passage of light through the image on a slide; a member slidable on and relative to said carrier means and having means operable when a slide is in said viewing position, to engage and move said blind out of said light obstructing position; said member being slidable relative to said carrier means in the direction of movement in which said slide is returned to the magazine following such return, and means operable responsive to said last named movement of said member for shifting said magazine to dispose a slide in position to be moved by said carrier means.

10. In a slide changer for moving a plurality of slides containing images into and out of a viewing position with respect to a viewer or projector: a magazine for a plurality of such slides; a body supporting said magazine; a guide track for said slides extending from said body; carrier means reciprocal on said track for moving said slides from said magazine into said viewing position and vice-versa; means mounting said magazine so that it may be shifted to successively dispose said slides in position to be so moved by said carrier means; and a member on said carrier means slidable relative thereto in a direction opposite the direction of movement of the slides into said viewing position; magazine shifting means operable responsive to said movement of said member; an opaque blind movable into and out of position to prevent passage of light through the image in said slide; and means on said blind engageable by said slidable member for moving said blind out of said obstructing position.

11. In a slide changer for moving a plurality of slides containing images into and out of a viewing position with respect to a viewer or projector; a magazine for a plurality of such slides; a body supporting said magazine; means providing a rigid guide track for said slides extending from said body and adapted to be so positioned with respect to a viewer or projector that the slides may be disposed in viewing position therein; said track having side walls between which the slides are movable; said walls having openings therein with which images on the slides are registered when a slide is in said viewing position, a blind movable into and out of a position excluding light from passing through said images; spring means normally urging said blind into said light obstructing position; a carrier for said slides reciprocable between said walls on said track for moving said slides into and out of said viewing position; means associated with said body and said magazine operable for shifting the magazine to move the slides progressively into position to be moved by the carrier into said viewing position; and a member for operating said shifting means and said blind supported by said carrier and movable in opposite directions relative thereto to engage and move said blind out of said light obstructing position and to engage and operate said shifting means respectively.

12. In a slide changer of the class including: a slide magazine; track means for receiving a slide from the magazine; carrier means for moving a slide to and from a viewing position from a position in said magazine and back into said magazine; means for shifting said magazine to present successive slides to said carrier means; and a blind normally occluding the viewing position of said slide and shiftable to a non-occluding position; that improvement wherein said carrier means includes a member reciprocably mounted thereon and having end portions projecting in opposite directions from said carrier means upon opposite movements of said member relaitve to said slide; said member having means at one end engageable with said magazine shifting means to operate the same; said member having means at its other end engageable with said blind to move the same out of said occluding position.

13. In a slide changer of the class including: a slide magazine; track means for receiving a slide from the magazine; carrier means for moving a slide to and from a viewing position from a position in said magazine and back into said magazine; means for shifting said magazine to present successive slides to said carrier means; and a blind normally occluding the viewing position of said slide and shiftable to a non-occluding position; that improvement wherein said carrier means includes a member reciprocably mounted thereon and having end portions projecting in opposite directions from said carrier means upon opposite movements of said member relative to said slide; said member having means at one end engageable with said magazine shifting means to operate the same; said member having means at its other end engageable with said blind to move the same out of said occluding position; said carrier means and said track means having cooperative means for limiting movement of said carrier means to a slide viewing position.

14. In a slide changer of the class including: a slide magazine; track means for receiving a slide from the magazine; carrier means for moving a slide to and from a viewing position from a position in said magazine and back into said magazine; means for shifting said magazine to present successive slides to said carrier means; and a blind normally occluding the viewing position of said slide and shiftable to a non-occluding position; that improvement wherein said carrier means includes a member reciprocably mounted thereon and having end portions projecting in opposite directions from said carrier means upon opposite movements of said member relative to said slide; said member having means at one end engageable with said magazine shifting means to operate the same; said member having means at its other end engageable with said blind to move the same out of said occluding position; said carrier means having means at one end releasably engaged with said member for preventing relative movement of said carrier means and member; and said track means having means for effecting disengagement of said releasable means from said member upon movement of the carrier means to one of the slide positions aforesaid.

15. In a slide changer of the class including: a slide magazine; track means for receiving a slide from the magazine; carrier means for moving a slide to and from a viewing position from a position in said magazine and back into said magazine; means for shifting said magazine to present successive slides to said carrier means; and a blind normally occluding the viewing position of said slide and shiftable to a non-occluding position; that improvement wherein said carrier means includes a member reciprocably mounted thereon and having end portions projecting in opposite directions from said carrier means upon opposite movements of said member relative to said slide; said member having means at one end engageable with said magazine shifting means to operate the same; said member having means at its other end engageable with said blind to move the same out of said occluding position; said carrier means including a member shiftable in said track; one of said members having a resilient portion engageable with the other member for preventing relative movement of said members in one direction; means on said track means normally maintaining said resilient portion in operative engagement with said members; and said track means having a depression for receiving said resilient portion to release said reciprocable member for movement relative to said carrier member.

16. A slide carrier mechanism for moving slides from a magazine to a viewing position in a slide track of a slide viewer or projector, comprising: means defining a longitudinally extended channel; a longitudinally extended carrier member shiftably disposed in said channel; said carrier member having slide engaging means at its opposite ends projecting from said channel; a member shiftably disposed in said channel in sliding engagement with said carrier member; spring elements at opposite ends of one of said members and flexed into engagement with the opposite ends of the other of said members; and said channel having a pair of spaced recesses for receiving said spring elements upon movement of the slide element to a predetermined position in said channel for releasing said members for relative longitudinal movement.

17. A slide carrier mechanism for moving slides from a magazine to a viewing position in a slide track of a slide viewer or projector, comprising: means defining a longitudinally extended channel; a longitudinally extended carrier member shiftably disposed in said channel; said carrier member having slide engaging means at its opposite ends projection from said channel; a member shiftably disposed in said channel in sliding engagement with said carrier member; spring elements at opposite ends of one of said members and flexed into engagement with the opposite ends of the other of said members; and said channel having a pair of spaced recesses for receiving said spring elements upon movement of the slide element to a predetermined position in said channel for releasing said members for relative longitudinal movement; an operating handle on one of said members, and a friction producing member interposed between said channel defining means and said handle.

References Cited in the file of this patent

UNITED STATES PATENTS

| | | |
|---|---|---|
| 482,238 | Force | Sept. 6, 1892 |
| 773,786 | Colordeau et al. | Nov. 1, 1904 |
| 775,963 | Bentzon | Nov. 29, 1904 |
| 1,082,260 | Brown | Dec. 23, 1913 |
| 1,151,221 | Schwanhausser | Aug. 24, 1915 |
| 2,519,251 | Johanson | Aug. 15, 1950 |
| 2,711,602 | Wiklund | June 28, 1955 |
| 2,756,630 | Goldberg | July 31, 1956 |